United States Patent Office 3,697,310
Patented Oct. 10, 1972

3,697,310
METHOD OF BONDING POLYESTER SYNTHETIC FIBROUS MATERIAL TO RUBBER COMPOUND
Osamu Kurihara, Naoya Kuramoto, Masaya Kamiyoshi, and Takeshi Yamaguchi, Iwakuni, Japan, assignors to Teijin Limited, Osaka, Japan
No Drawing. Filed Jan. 27, 1971, Ser. No. 110,274
Claims priority, application Japan, Jan. 29, 1970, 45/7,840
Int. Cl. C08d 13/16; B32b 27/36
U.S. Cl. 117—76 T
8 Claims

ABSTRACT OF THE DISCLOSURE

A polyester fibrous material is bonded to rubber with superior bond strength by applying to the polyester material an aqueous adhesive dispersion comprising (A) a water-insoluble phenol/aldehyde resin having a melting point of not more than 160° C. or a viscosity of at least 50 centipoises obtained by condensing one mol of phenol or its derivative, 0.2 to 1.0 mol of formaldehyde and 0.05 to 0.5 mol of an alkyl or arkenyl aldehyde such as n-butyraldehyde and (B) a rubber latex, and bonding the polyester material to rubber by heating and vulcanization.

---

This invention relates to a method of bonding a polyester synthetic fibrous material to a rubber compound with improved bond strength, in which an aqueous dispersion adhesive to be used has good storage stability and a reduction in bond strength is substantially completely prevented even when it is stored for prolonged periods of time, and which is free from various restrictions imposed by textile finishing compositions which polyester fibers usually have on their surfaces.

More specifically, the invention relates to a method of bonding a polyester synthetic fibrous material to a rubber material, which comprises applying to a polyester synthetic fibrous material an aqueous dispersion comprising (A) a water-insoluble phenol aldehyde resin which is a thermoplastic solid having a melting point of not more than 160° C. or a liquid having a viscosity of at least 50 centipoises obtained by condensing (a) 1 mol of phenol or its derivative expressed by the following formula

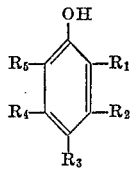

wherein each of $R_1$ to $R_5$ is a member selected from the group consisting of hydrogen, aalkyl, alkenyl, aralkyl, and aryl, at least two of $R_1$, $R_3$ and $R_5$ being hydrogen, (b) 0.2 to 1.0 mol of formaldehyde, and (c) 0.05 to 0.5 mol of an aldehyde selected from the group consisting of alkyl aldehydes and alkenyl aldehydes, and (B) a rubber latex; heat-treating the fibrous material so treated; and bonding the fibrous material to a rubber compound by vulcanization.

Heretofore, the two-bath methods and one-bath methods have been known to bond polyester fibers to rubber. In one two-bath method known, a first bath comprises an epoxy compound, an isocyanate compound, a phenol-blocked isocyanate compound, bisethyleneurea compound, polyvinyl chloride, etc. and a second bath comprising an aqueous composition (to be referred to as RFL) comprising a condensation product of resorcinol and formaldehyde and a rubber latex are used. The two-bath method, however, has the defect of high cost of equipment and processing.

As the one-bath method, methods are known to use such adhesives as an aqueous composition comprising resorcinol, hexamethylene tetramine and triethyleneurea compound (Japanese patent publication No. 2,275/67), an aqueous composition comprising a rubber latex and a modified aldehyde resin obtained by reacting a blocked isocyanate with resorcinol, with aldehyde (Japanese patent publication No. 28,937/65), and an aqueous composition comprising resorcinol, monoglycidyl ether, formaldehyde and a rubber latex (Japanese patent publication No. 12,355/67). These adhesives, however, give insufficient bond strength, or cannot be stored for prolonged periods of time because of their poor storage stability which is caused by the presence of reactive materials.

An aqueous dispersion comprising a rubber latex and a condensation product obtained at room temperature between 1 mol of phenol or resorcinol and 2–3 mols of more of formaldehyde has been known as an RFL adhesive. The condensation product, however, is a highly polar, water-soluble phenol (or resorcinol) formaldehyde oligomer (low polymers of dimers to pentamers) having much phenolic hydroxyl groups or methylol hydroxyl groups, which has a viscosity of about 20 to 30 centipoises. This adhesive is superior for bonding rayon or polyamide to rubber. But even if polyester fibers are treated with this aadhesive, adhesion between polyester and rubber is very poor.

U.S. Pat. 3,437,610 discloses the use of a water-soluble resorcinol/aldehyde resin obtained by reacting a condensation product btween resorcinol and an aldehyde of 3 to 6 carbon atoms, with formamide, in the bonding of polyester cords to rubber.

According to this proposal, improved bond strength can be obtained as compared with the use of the aforementioned RFL adhesive. But as will be shown later in Table 1, the bond strength is not sufficiently high. Furthermore, the storage stability of the aqueous dispersion adhesive to be used is poor, and the bond strength tends to be reduced when the storage time is prolonged. Furthermore, there is a restriction on the finishing compositions to be adhered to the surface of polyester fibers, and if this restriction is not observed, the resulting bondage is of low strength. Depending upon some types of finishing composition, it is necessary to add a pre-treating step for removing the finishing compositions prior to bonding. Also, in the method disclosed by the U.S. patent, the order in which the butyraldehyde and formaldehyde are condensed with resorcinol is critical, and thus the manufacturing procedure is restricted.

We have now found that phenol aldehyde resins of particular composition and properties described above, which depart from the technical concept of utilizing the resorcinol/aldehyde resin in the bonding of polyamides or polyesters with rubber, exhibit far improved bond strength, and can be stored for prolonged periods of time without appreciable reduction in bond strength; and that these resins give outstanding results in providing an adhesive for use in bonding polyester fibrous materials to rubber.

Hitherto, the resorcinol/aldehyde resins have been utilized as water-soluble resins in the bonding of polyamides or polyesters to rubber. In contrast, it is noteworthy that in the present invention, water-insoluble phenol/aldehyde resins are utilized, and gives the outstanding results mentioned above. The molar ratio of (a), (b), and (c) components are pretty critical, and the objects of the invention cannot be achieved when these compounds (a), (b) and (c) are used in ratios outside the specified range, as will be seen from Table 2 below. It is not clear why the outstanding improvement is brought about by using the phenol/aldehyde resin (A) specified above, but it is seen from the results shown in Tables 1, 2 and 2' below that the use of these phenol/aldehyde resins (A) is essential in the present invention.

Accordingly, an object of the present invention is to provide a method of bonding a polyester fibrous material to a rubber material with improved adhesion.

A second object of the invention is to provide an adhesive composition for use in such bonding.

A third object of the invention is to provide articles bonded by such bonding method.

Many other objects and advantages of the present invention will become clearer from the following description.

The aqueous dispersion used in the method of the present invention is an aqueous dispersion comprising (A) a water-insoluble phenol/aldehyde resin which is a liquid having a viscosity of at least 50 centipoises, preferably at least 1,000 poises or a thermoplastic solid having a melting point of not more than 160° C., preferably not more than 130° C. obtained by condensing the three components (a), (b) and (c), and (B) a rubber latex. The aqueous dispersion may of course contain known additives, for instance, vulcanizers such as sulfur and zinc oxide; vulcanizing promotors such as zinc dimethyl dithiocarbamate or mercaptobenzothiazole; anti-oxidants such as phenyl-$\beta$-naphthylamine, di-p-methoxydiphenylamine, or aldol-$\alpha$-naphthylamine; fillers such as carbon black, or colloidal silica; anionic or nonionic surface active agents (dispersing agents) such as sodium dodecyl benzenesulfonate, polyoxyethylene laurate, and polyoxyethylene nonylphenyl ether; and pH-adjusting alkaline substances such as ammonium hydroxide or alkali hydroxides. The term aqueous dispersion comprising the resin (A) and the rubber latex (B), therefore, is meant to include the aqueous dispersion which further contain the aforementioned additives.

The amounts of these additives are within those ranges which are normally used. It is usual that the sum of the amounts of the vulcanizer, vulcanization promotor, antioxidant, and filler is not more than 10% by weight of the total solids content of the resin (A) and rubber latex (B). The dispersing agent is used normally in an amount of not more than 10% by weight of the solids content of the resin (A), and the amount of the pH-adjusting agent is usually one which is sufficient to bring the pH of the aqueous dispersion to about 9–13.

The ratio between the resin (A) and the rubber latex (B) may be varied over a considerably wide range. It is preferred however that the rubber latex (B) should be used in an amount of 0.5 to 10 parts by weight or so as solids content per part by weight of the solids content of the resin (A). More preferably, the amount of the rubber latex (B) as solids content is about 1 to 5 parts by weight per part by weight of the solids content of the resin (A).

The sum of the amounts of the resin and the rubber in the adhesive aqueous dispersion may be carried over a considerably wide range. Generally, it is preferred that the total amount as the solids content be about 2.5 to 25% by weight, more preferably about 10-20% by weight.

The water-insoluble phenol/aldehyde resin (A) is obtained by condensing (a) 1 mol of the phenol or its derivative described above, (b) 0.2 to 1.0 mol, preferably 0.4 to 1.0 mol, of formaldehyde, and (c) 0.05 to 0.5 mol of aldehyde described above.

As the component (a), compounds wherein at least two ortho and para positions contain unsubstituted hydrogen are necessary in order to form linear high polymers by reaction of the unsubstituted hydrogen with aldehyde. Preferred compounds are phenol or its derivatives of the formula wherein each of $R_1$ through $R_5$ is a member selected from the group consisting of hydrogen, $C_1$–$C_{15}$, preferably $C_1$–$C_{10}$, alkyl groups, alkenyl groups having 2 to 5 carbon atoms, benzyl group or phenyl group. Specific examples of the component (a) include phenol, o-cresol, m-cresol, p-cresol, o-ethylphenol, m-ethylphenol, p-ethylphenol, 2,5-xylenol, 3,4-xylenol 35-xylenol p-tert.-butylphenol p-iso-butyl phenol, p-octyl phenol, p-cumyl phenol, p-nonyl phenol, o-allyl phenol, p-phenyl phenol, and p-benzylphenol.

The formaldehyde as component (b) include ordinary formaldehyde (formalin), and paraformaldehyde.

Preferred alkyl aldehydes as component (c) are those wherein the alkyl group has 1 to 15 carbon atoms, and preferred alkenyl aldehydes as component (c) are those in which the alkenyl group has 2 to 5 carbon atoms. Specific examples of the component (c) include acetaldehyde, propionaldehyde, n-butyraldehyde, iso-butyraldehyde, n-valeraldehyde, n-heptylaldehyde, n-ethylhexylaldehyde, n-laurylaldehyde, n-myristylaldehyde, acrolein, and crotonaldehyde.

The resin (A) can be obtained by reacting the components (a), (b) and (c) simultaneously or in an optional order. In the condensation reaction, both acid catalysts and alkali catalysts can be used, but the use of an acid catalyst is preferable. Examples of the acid catalyst are mineral acids, oxalic acids, and paratoluenesulfonic acid; or oxides of the metals of Group II of the Periodic Table to be used conjointly with the acids mentioned. As the alkali catalyst, we can mention, for example, alkali hydroxides. Other acid and alkali catalysts known to be used in the production of phenol/aldehyde resin can be used. The amounts of these catalysts may be within the conventional ranges, and usually the preferred amounts are $10^{-4}$ to $10^{-1}$ mol or so per mol of the component (a).

In the reaction mentioned above, the initial stage under reflux is carried out at at least 50° C., preferably around 100° C., and then the dehydration reaction is carried out at a temperature of, for example, 100 to 180° C. or under reduced pressure, thereby to form a liquid having a viscosity, measured at 25° by the method of ASTM D1824–66, of at least 50 centipoises, or a thermoplastic solid having a melting point, measured by the ball method according to ASTM E28–58T, of not more than 160° C. The phenol/aldehyde resin obtained is emulsified in water with the aid of a solvent such as methanol, ethanol, acetone or methyl ethyl ketone and/or an emulsifier such as nonionic or anionic surfactants, and then blended with a rubber latex to form an adhesive aqueous suspension.

When in the preparation of the phenol/aldehyde resin used in the invention, the amount of formaldehyde is less than 0.2 mol per mol of phenol or its derivative, the viscosity of the resulting resin is low, and good bond strength cannot be obtained. Amounts in excess of 1.0 mol per mol of phenol or its derivative result in infusible and insoluble resins and cause a decrease in bond strength. The bond strength will also be reduced when the amount of the alkyl aldehyde or alkenyl aldehyde is less than 0.05 or above 0.5 per mol of phenol or its derivative. If the viscosity of the phenolic resin used in the invention is less than 50 centipoises, the degree of polymerization becomes too low, and there is a reduction in bond strength. Furthermore, if the melting point of the resin is in excess of 160° C., it will be gelled during reaction, and become insoluble in acetone, which in turn causes a reduction in bond strength.

Examples of the rubber latex to be blended with the phenol/aldehyde resin in the invention include natural rubber latices, vinyl pyridine/styrene/butadiene copolymer latex (VP-latex for short), styrene/butadiene copolymer latex (SBR-latex for short), butyl rubber latex, polybutadiene latex, acrylonitrile/butadiene copolymer latex, polychloroprene latex, carboxy-modified polybutadiene latex, and hydroxy-modified polybutadiene latex either alone or in admixture. VP-latex and a mixture of VP-latex and other latex are especially preferred.

According to the method of the present invention, an aqueous dispersion comprising the water-insoluble phenol/formaldehyde resin (A) and rubber latex (B) is applied to a polyester synthetic fibrous material, followed by heat-treatment, and then the fibrous material so treated is bonded to a rubber material by vulcanization.

The application of the aqueous dispersion to the fibrous material is effected by any known means chosen depending upon the form of the material, which include dipping, spraying, or coating. After application of the aqueous dispersion, the fibrous material is heat-treated with or without prior drying. The heat-treating temperature that is preferred in the invention is not more than the melting point of the polyester synthetic fibrous material, but not less than about 200° C. Usually, the temperatures between about 200° C. and 270° C., preferably between about 200° C. and 250° C., more preferably between 220° C. and 245° C., are employed.

Bonding of the treated fibrous material to a rubber compound by vulcanization can be effected by any known means. The rubber compound is uncured rubber compound. The treated fibrous material is brought into contact with the rubber compound, and heated with or without applying pressure, whereby vulcanization and bonding are effected. The heating temperature may be the vulcanization temperature of the rubber compound, but usually the temperatures of about 120 to 200° C. can be used.

The form of the polyester synthetic fibrous material can be varied over a wide range, and includes, for example, fibers, filaments, yarns, cords, tows, strands, tapes, films, sheets, woven fabrics, knitted fabrics, nonwoven fabrics, or felts.

The method of the invention can be utilized for the bonding of polyester tire cord to a rubber compound, or the bonding of a belt reinforcing polyester synthetic fibrous material to a belt-making rubber compound, and also in the fields of reinforced rubber articles such as hoses, water-proofed sheets, water-proofed apparel materials, bags, and the like.

The polyesters used in the present invention are normally those derived from terephthalic acid or naphthalene-2,6-dicarboxylic acid as an acid component and ethylene glycol as a glycol component. As the acid component, there may be used a mixture of at least 90 mol percent of terephthalic acid or naphthalene-2,6-dicarboxylic acid with not more than 10 mol percent of at least one bifunctional acid such as isophthalic acid, phthalic acid, adipic acid, sebacic acid, succinic acid, oxalic acid, malonic acid, p-hydroxybenzoic acid, $\omega$-hydroxycaproic acid. The glycol component may also be a mixture of at least 90 mol percent of ethylene glycol with not more than 10 mol percent of at least one diol compound such as trimethylene glycol, hexamethylene glycol, cyclohexanedimethanol (1,4), 2,2,4,4 - tetramethylcyclobutanediol (2,4), or hydroquinone.

The preferred rubber compounds used in the invention include, for example, natural rubbers such as hevea rubber, gutta-percha and balata, modified rubbers such as hydroxylated rubber, synthetic rubbers such as polychloroprene, styrenebutadiene copolymer, and acrylonitrile/butadiene copolymer, or blends of the synthetic rubbers and natural rubbers.

Some embodiments of the present invention will be described below by examples along with some comparisons.

EXAMPLE 1

A reaction vessel equipped with a condenser was charged with 94 gr. (1.0 mol) of phenol, 57 gr. (0.7 mol) of Formalin (37 wt. percent aqueous formaldehyde solution) and 14 gr. (0.2 mol) of n-butyraldehyde as the aldehyde component, and 10 ml. of 1 N aqueous solution of oxalic acid as the acid catalyst. The materials were refluxed for 2 hours at 110° C. The temperature was raised to 140° C., and condensation was effected for 5 hours in order to remove water and unreacted matter by distillation. The resulting phenol/aldehyde resin was a water-insoluble viscous liquid having a viscosity measured at 25° C. in accordance with ASTM D1824–66 of 14,000 centipoises.

Fifty grams of the resulting resin was dissolved in 100 gr. of acetone, and the solution was well mixed with 30 gr. of a 10 weight percent aqueous solution of sodium hydroxide. While the resulting alkaline solution of the resin was being rapidly stirred, 520 gr. of water was gradually added to disperse the resin uniformly. Two hundred grams of Hycar 2518 FS (40% VP latex, trade name for the product of Japanese Geon Co., Ltd.) and 50 gr. of Nipol LX–110 (40% SBR latex, tradename for the product of Japanese Geon Co., Ltd.) were added with stirring to give 1 kilogram of an aqueous dispersion.

For comparative purposes, and adhesive solution comprising a resorcinol/aldehyde resin and a rubber latex was prepared by the following procedure. A reaction vessel equipped with a condenser was charged with 110 gr. (1.0 mol) of resorcinol, 14.4 gr. (0.02 mol) of n-butyraldehyde and 5 ml. of a 1 N aqueous solution of oxalic acid. The materials were refluxed for one hour at 110° C., and 32.5 gr. (0.4 mol) of Formalin was gradually added, and the mixture was refluxed for one hour at 110° C. The temperature was raised to 140° C., and condensation was effected in order to remove water and unreacted matter by distillation. The resulting resorcinol/formaldehyde resin was a water-soluble thermoplastic solid having a melting point, measured in accordance with ASTM E–28–58T, of 48° C.

Fifty grams of the resulting resin was dissolved in 690 gr. of water and 10 gr. of a 10 wt. percent aqueous solution of sodium hydroxide, followed by adding 200 gr. of Hycar 2518 FS and 50 gr. of Nipol LX–110 with stirring, to obtain 1 kilogram of an aqueous dispersion.

The resulting adhesive liquids were stored at 25° C. for 2 hours, 2 days, 10 days, and 30 days, respectively. A polyethylene terephthalate tire cord (1000 denier/3-ply, number of twists 40 x 40 turns/10 cm., pick-up of finishing compositions about 0.6% by weight) to which an oil preparation No. 1 or No. 2 shown below had been adhered, was continuously dipped in each of the adhesive liquids, dried for 2 minutes at 120° C. by means of a Computreater (trade name of the dipping machine of C. A. Litzler Co., Inc.), and heat-treated for 1 minute at 240° C.

Finishing Composition No. 1

| Ingredients: | Parts (by weight) |
|---|---|
| Mineral oil | 60 |
| Triethanolamine | 10 |
| Oleic acid | 10 |
| Sulfonated castor oil | 15 |
| Dioctyl sulfosuccinate | 3 |
| Oleic alcohol | 2 |

Finishing Composition No. 2

| Ingredients: | Parts (by weight) |
|---|---|
| Mineral oil | 60 |
| Polyoxyethylene(3) laurylamine | 20 |
| Polyoxyethylene oleyl ether | 15 |
| Dioctyl sulfosuccinate | 5 |

Each of the treated tire cords was embedded in a rubber compound of the following recipe, and the vulcanization was performed for 30 minutes at 150° C.

Recipe of the rubber compound

| Ingredients: | Parts (by weight) |
|---|---|
| Natural rubber | 100 |
| Sulfur | 3 |
| Zinc oxide | 5 |
| Carbon black | 50 |
| Stearic acid | 3 |
| Pine tar | 5 |
| Accelerator M (mercaptobenzothiazole) | 1 |
| Antioxidant A (aldol-α-naphthylamine) | 1 |

Using each of the bonded articles, the bond strength of each cord at 20° C. was measured in accordance with ASTM D-2138-63T by means of the H-test (embedded length 10 mm.) and the T-stripping test (stripping speed 30 cm./min.) by means of an Instron tensile tester. The results are shown in Table 1 below.

It is seen from the results shown in Table 1 that the bonded articles obtained by the method of the invention exhibited high levels of bond strength irrespective of the type of the finishing composition adhered to the polyester tire cord, and the bond strength hardly changed according to the time during which the adhesive liquid applied was stored after preparation. This indicates that the adhesive liquid was stable without gelling. On the other hand, the bonded articles obtained by using the comparison adhesive liquid had lower bond strength, especially in the case of the polyester tire cord having adhered thereto the finishing compositions No. 1. This indicates that the comparison adhesive liquid has narrower applications for bonding polyester tire cord. Furthermore, when the comparison adhesive liquid was stored for long time, it tended to give increasingly low bond strength. The stability of the adhesive liquid was poor with attendant gellation on storage.

EXAMPLE 2

In each run, the adhesive liquid was prepared in the same manner as set forth in Example 1 except that the molar ratio of the formalin and n-butyraldehyde to phenol was varied as shown in Table 2. Using the adhesive liquid which was stored for 2 to 5 hours after preparation, the polyester tire cord having adhered thereto the finishing composition No. 1 shown in Example 1 was bonded to the rubber shown in Table 1 in the same manner as shown in Example 1. The bond strength was measured by the H-test. The results are given in Table 2.

It is seen from the results shown in Table 2 that when the aldehyde component was formalin or n-butyraldehyde alone or the molar ratio of these to phenol was outside the specified range, the resulting adhesive liquids gave reduced bond strengths with considerable criticality.

TABLE 2

| Number of adhesives | Moles of aldehyde per mol of phenol | | Properties of the resulting resin | | |
|---|---|---|---|---|---|
| | Formalin | n-Butyraldehyde | Form | Viscosity (c.p.) | Melting point (° C.) | H-test (kg.) |
| Comparison: | | | | | | |
| 2 | 1.2 | 0.1 | Solid | | (¹) | 10.7 |
| 3 | 0.9 | 0 | do | | 105 | 13.8 |
| Invention: | | | | | | |
| 2 | 0.8 | 0.1 | do | | 96 | 18.2 |
| 3 | 0.7 | 0.2 | Liquid | 14,000 | | 18.6 |
| 4 | 0.5 | 0.4 | do | 6,700 | | 18.4 |
| 5 | 0.4 | 0.5 | do | 4,200 | | 18.4 |
| Comparison: | | | | | | |
| 4 | 0.1 | 0.8 | do | 2,300 | | 11.3 |
| 5 | 0 | 0.9 | do | 1,850 | | 10.5 |

¹ Infusible.

The same procedure was repeated except that the number of mols of aldehydes per mol of phenol, the reaction time, and the reaction temperature were varied as shown in Table 2'. The results are also shown in Table 2'.

TABLE 2'

| Number of adhesives | Mols of aldehydes per mol of phenol | | Condensation conditions | | Properties of the resulting resin | | | |
|---|---|---|---|---|---|---|---|---|
| | Formalin | n-Butyraldehyde | Temperature (° C.) | Time (hours) | Form | Viscosity (cp.) | Melting point (° C.) | H-test (kg.) |
| Comparison 6 | 0.5 | 0.1 | (¹) | (¹) | Liquid | 38 | | 12.1 |
| Invention: | | | | | | | | |
| 6 | 0.5 | 0.1 | 140 | 5 | do | 1,300 | | 18.3 |
| 3 | 0.7 | 0.2 | 140 | 5 | do | 14,000 | | 18.6 |
| 7 | 0.7 | 0.2 | 160 | 5 | Solid | | 93 | 18.8 |
| 8 | 0.8 | 0.3 | 140 | 2 | do | | 128 | 18.5 |
| Comparison 7 | 0.8 | 0.3 | 160 | 5 | do | | (²) | 11.2 |

¹ Not condensed.
² Infusible.

TABLE 1

| Adhesion (kg.) finishing composition of polyester cord | H-test | | T-stripping test | |
|---|---|---|---|---|
| | No. 1 | No. 2 | No. 1 | No. 2 |
| (Adhesive liquid of the invention), stored for: | | | | |
| 2 hours | 18.7 | 18.8 | 3.3 | 3.1 |
| 2 days | 18.5 | 18.6 | 3.1 | 3.2 |
| 10 days | 18.7 | 18.7 | 3.4 | 2.9 |
| 30 days | 18.6 | 18.8 | 3.3 | 3.2 |
| (Comparison adhesive liquid—comparative Example 1), stored for: | | | | |
| 2 hours | 11.5 | 13.4 | 1.6 | 2.1 |
| 2 days | 10.3 | 14.2 | 1.2 | 1.8 |
| 10 days | 9.7 | 11.2 | 0.8 | 1.1 |
| 30 days | Gelled | Gelled | Gelled | Gelled |

EXAMPLE 3

An adhesive liquid was prepared in the same manner as set forth in Example 1 (present invention) except that the phenol component and alkyl or alkenyl aldehyde component were changed, and the molar ratios of formalin and alkyl or alkenyl aldehyde component were also changed. The bond strength of the resulting bonded products obtained in the same manner as shown in Example 1 was measured in the same manner as shown in Example 2. The results are given in Table 3. It is seen from the results shown in Table 3 that the adhesive liquid comprising the phenol and aldehyde defined in the present invention exhibits high bond strength.

TABLE 3

| Number of adhesives | Phenol component | Alkyl or alkenyl aldehyde component | Form | Properties of the resulting resin | |
|---|---|---|---|---|---|
| | | | | Viscosity | H-test (kg.) |
| 1 | Phenol | n-Butyraldehyde | Liquid | 14,000 | 18.7 |
| 2 | m-Cresol | do | do | 18,000 | 18.8 |
| 3 | m-Octyl phenol | do | do | 8,600 | 18.5 |
| 4 | o-Allyl phenol | do | do | 12,000 | 18.6 |
| 5 | p-Benzyl phenol | do | do | 3,600 | 17.7 |
| 6 | p-Phenyl phenol | do | do | 4,300 | 17.8 |
| 7 | Phenol | n-Caprylaldehyde | do | 10,600 | 18.5 |
| 8 | do | n-Myristylaldehyde | do | 6,200 | 17.7 |
| 9 | do | Crotonaldehyde | do | 16,300 | 18.3 |

EXAMPLE 4

The procedure of Example 1 was repeated except that the proportion between the phenol/aldehyde resin and the rubber latex was changed. The H-test was conducted to measure the bond strength of the polyester tire cord having adhered thereto the oil preparation No. 1 to rubber. The results are given in Table 4.

TABLE 4

| Number of adhesive | Solids contents in weight percent in the adhesive liquid | | | H-test (kg.) |
|---|---|---|---|---|
| | Resin | Rubber | Total | |
| 1 | 7.0 | 8.0 | 15.0 | 18.7 |
| 2 | 5.0 | 10.0 | 15.0 | 18.8 |
| 3 | 3.0 | 12.0 | 15.0 | 18.2 |
| 4 | 3.0 | 6.0 | 9.0 | 18.6 |
| 5 | 6.0 | 12.0 | 18.0 | 17.9 |

EXAMPLE 5

The procedure of Example 1 was repeated except that the type of the rubber latex was changed in the production of the adhesive liquid according to the invention. Using the polyester tire cord having adhered thereto the oil preparation No. 1, the bond strength was measured by the H-test.

The results are given in Table 5. It is seen that VP latex alone or a mixture of VP latex and other rubber latex gives high levels of bond strength.

TABLE 5

| Type of rubber latex | Solids [1] | H-test (kg.) |
|---|---|---|
| Hycar 2518 FS (VP) | 8.0 | 18.7 |
| Nipol LX-110 (SBR) | 2.0 | |
| Hycar 2518 FS (VP) | 10.0 | 18.8 |
| Nipol LX-110 (SBR) | 10.0 | 17.5 |
| Hycar 2518 FS (VP) | 5.0 | 18.2 |
| Neoprene 400 (CR) [2] | 5.0 | |
| Hycar 2518 FS (VP) | 8.0 | 18.6 |
| Hycar 1562 (NBR) [3] | 2.0 | |

[1] Content of the rubber latex in the adhesive liquid (weight percent).
[2] 50% polychloroprene latex, tradename of the product of Showa Neoprene Co., Ltd.
[3] 41% acrylonitrile/butadiene copolymer latex, tradename of the product of Japanese Geon Co., Ltd.

What is claimed is:

1. A method of bonding a polyester synthetic fibrous material to a rubber compound, which comprises applying to a polyester synthetic fibrous or sheet-like material an aqueous dispersion comprising (A) a water-insoluble phenol/aldehyde resin which is a thermoplastic solid having a melting point of not more than 160° C. or a liquid having a viscosity of at least 50 centipoises obtained by condensing (a) 1 mol of phenol or its derivative expressed by the following formula

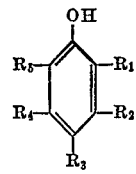

wherein each of $R_1$ through $R_5$ is a member selected from the group consisting of hydrogen, alkyl, alkenyl, aralkyl and aryl, at least two of $R_1$, $R_3$ and $R_5$ being hydrogen, (b) 0.2 to 1.0 mol of formaldehyde, and (c) 0.05 to 0.5 mol of an aldehyde selected from the group consisting of alkyl aldehydes and alkenyl aldehydes and (B) a rubber latex, the amount of said rubber latex (B) being 0.5 to 10 parts by weight per part by weight of said water-insoluble phenol/aldehyde resin (A), the total amount of said resin and rubber in said aqueous dispersion being 2.5 to 25% by weight as solid content; heat-treating the fibrous material so treated; and bonding the fibrous material to a rubber material by vulcanization.

2. The method of claim 1, wherein the heat-treatment is carried out at a temperature not more than the melting point of said polyester synthetic fibrous material but not less than 200° C.

3. The method of claim 1, wherein each of $R_1$ through $R_5$ is selected from the group consisting of hydrogen, $C_1$-$C_{15}$ alkyls, $C_2$-$C_5$ alkenyls, benzyl, and phenyl.

4. The method of claim 1, wherein the alkyl group of the alkyl aldehyde has 1 to 15 carbon atoms, and the alkenyl group of the alkenyl aldehyde has 2 to 5 carbon atoms.

5. The method of claim 1, wherein the amount of the formaldehyde is 0.4 to 1.0 mol per mol of the phenol or its derivative.

6. The method of claim 1, wherein the rubber latex is a natural rubber latex, vinyl pyridine/styrene/butadiene copolymer latex, styrene/butadiene copolymer latex, butyl rubber latex, polybutadiene latex, acrylonitrile/butadiene copolymer latex, polychloroprene latex, carboxy-modified polybutadiene latex or hydroxy-modified polybutadiene latex.

7. The method of claim 1, wherein said rubber latex is a vinylpyridine/styrene/butadiene copolymer latex, or mixtures of said copolymer latex with nautral rubber latex, styrene/butadiene copolymer latex, butyl rubber latex, polybutadiene latex, acrylonitrile/butadiene copolymer latex, polychloroprene latex, carboxy-modified polybutadiene latex or hydroxy-modified polybutadiene latex.

8. The method of claim 1, wherein said polyester fibrous material is in the form of fibers, filaments, yarns, cords, tows, strands, tapes, films, sheets, woven fabrics, knitted fabrics, non-woven fabrics, or felts of polyester.

References Cited

UNITED STATES PATENTS 3,437,610   4/1969   Moult _____ 117—138.8 F X
3,433,664   3/1969   Osborne _____ 117—138.8 F X

OTHER REFERENCES

Webster's New Collegiate Dictionary, G. & C. Merriam Co., Springfield, Mass., 1961, pp. 308 and 310.

RALPH HUSACK, Primary Examiner

U.S. Cl. X.R.

117—76 F, FB, 80, 138.8 F; 156—110 A, 335; 260—3, 29.3, 844